Feb. 25, 1969  R. MICHEL  3,429,545

SHOCK ABSORBER FOR PERSONS

Filed Oct. 26, 1966

INVENTOR.
RUDOLPH MICHEL
ATTYS.

United States Patent Office 3,429,545
Patented Feb. 25, 1969

3,429,545
SHOCK ABSORBER FOR PERSONS
Rudolph Michel, 6518 40th Ave.,
Hyattsville, Md. 20782
Filed Oct. 26, 1966, Ser. No. 590,138
U.S. Cl. 248—358     10 Claims
Int. Cl. A43b 21/32

ABSTRACT OF THE DISCLOSURE

A shock absorber device mounted on the bottom of a shoe, at the heel, and having relatively movable upper and lower members with a ratchet like locking means therebetween. A spring means is between the upper and lower members and the ratchet locking means prevents rebounding of the members after they have moved to absorb a predetermined shock.

The invention described herein may be manufactured and used by or for the Government of the United States of America for governmental purposes without the payment of any royalties thereon or therefor.

The invention relates to a device for protecting persons from shock transmitted to their pedal extremities.

More particularly the invention relates to a device to be mounted on the bottom of a shoe, preferably at the heel portion thereof, to absorb shock transmitted through the shoe to the wearer from the supporting surface of ground.

The invention is especially designed to protect shipboard personnel from injuries to the foot and leg bones by reducing or preventing the transmission thereto of severe shipboard shocks, such as are caused by underwater or contact explosions due to torpedoes or mines.

Prior art devices such as shock mounts for machinery or the like are not directed to the problem of protecting persons from severe shock transmitted through their feet as is the present invention.

Prior art devices such as spring cushioned shoes and shoe heels for walking, or cushioned shoes for parachute jumping or for walking over mine fields, are also not directed to and do not solve the problem to which the present invention is directed.

The invention comprises in general a shock absorber device mounted on the bottom of a shoe, preferably at the heel thereof, and having relatively movable upper and lower members with resilient shock absorbing means therebetween, the lower member having means engaging an upright peripheral surface portion of the upper member and having frictional engagement therewith, and a clamping means embracing the lower member and urging it into such frictional engagement to resist recoil or rebound following compression of the resilient means under shock transmitted to the lower member from the supporting surface.

The invention further comprises the provision of circumferential ratchet-like grooves or serrations in the upright peripheral surface portion of the upper member and finger-like projections on the lower member for engaging the grooves or serrations, which when held by the embracing clamping means will permit forced relative frictional movement between the upper and lower members when the resilient means is compressed by shock, but will hold the device in compressed condition and will prevent recoil or rebound therefrom, and thus will protect the person from such recoil or rebound force.

The invention further provides for resetting or re-arming of the shock absorber device for re-use by providing for releasing the embracing clamping means to facilitate moving the projections out of engagement with an upper circumferential groove or serration to move the lower member down relative to the upper member, and re-applying the projections into engagement with a lower serration.

The invention further provides interruptions in the circumferential grooves or serrations comprising smooth areas of a width circumferentially to permit the upwardly extending projections on the lower member to be turned out of engagement with the serrations onto the smooth areas to permit the projections on the lower member to be readily moved downwardly over the smooth areas and to be turned into engagement with a lower serration.

The invention further involves the shape and configuration of the circumferential grooves or serrations on the upper member and being in one form of inclined screw thread formation with the upwardly extending projections correspondingly inclined to conform to and follow the inclination or pitch of the thread serrations, and other detailed features as hereinafter more fully described and claimed.

It is therefore an object of the present invention to provide a shock absorber device mounted on the bottom of a shoe, desirably at the heel portion thereof, to effectively absorb and mitigate severe shocks transmitted to the body of a person through the shoe.

Another object of the invention is the provision of such a device which is rugged and simple in construction and can be readily and inexpensively manufactured.

A further object is to provide such a shock absorber device which is of relatively light weight and can form a part of footwear to be worn by persons under conditions where such severe shocks are likely to occur, such as may be encountered by shipboard personnel.

Another object is to provide such a shock absorber device with means to prevent persons from being subjected to any rebound or recoil force following absorption of the shock by the device, and thereby to further mitigate or prevent adverse effects on the body by forces resulting from the shock.

Other objects, advantages and novel features of the invention will become apparent from the following detailed description of the invention when considered in conjunction with the accompanying drawings wherein.

Figure 1:
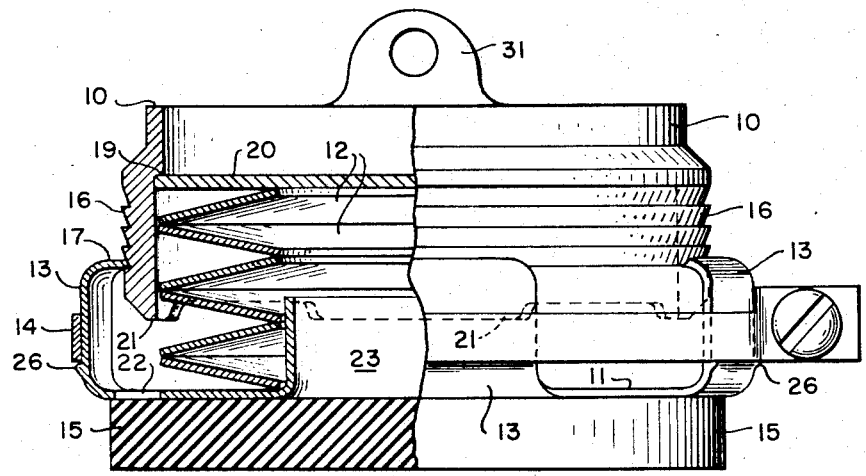
FIG. 1 is an elevation partly in section of an embodiment of the invention.

Referring now to the drawings, wherein like reference characters designate like or corresponding parts throughout the several views, there is shown in FIG. 1, an embodiment of the invention of a shock absorber for protecting persons which is to be mounted on the bottoms of their shoes. The numeral 10 designates an upper member of the device which is secured to the shoe bottom portion, desirably to the heel portion thereof, by a suitable means.

The numeral 11 designates a lower member which is movable relative to the upper member 10, and the numeral 12 designates resilient shock absorbing means disposed between and urging the upper and lower members apart.

The lower member 11 has upwardly extending finger-like projecting members or arms 13 having engagement with an upright peripheral surface portion of the upper member 10 which carries serrations or grooves 16.

A removable clamping band member 14 embraces the lower member 11 and constrains or urges its projecting members or arms 13 into the frictional engagement with the upright peripheral surface of the upper member 10, to hold the upper and lower members together and to resist any recoil or rebound following compression of the shock absorbing resilient means 12 under shock transmitted to the lower member from the supporting surface.

Suitable means are provided for removably securing the clamping band member 14 in clamping position around the projecting arms 13 of the lower member.

The clamping member 14 is disposed toward the lower part of the projecting arms or fingers 13 of the lower member, which fingers are made sufficiently resilient so that their upper portions will resiliently and frictionally engage the upright peripheral surface of the upper member 10 when constrained by the clamping member 14.

A rib 26 is provided on the projecting arms or fingers of the lower member to prevent the clamping member 14 from slipping downwardly off of the lower member 11.

An elastic or resilient pad 15 of rubber or elastomer is bonded as by cement to the bottom of the lower member 11 and may provide additional means for absorbing shock, as well as for cushioning the device in walking.

Desirably the device, in general, is constructed of any suitable strong light metal.

The invention further comprises the provision of ratchet-like circumferential grooves or serrations 16 in the upright peripheral surface portion of the upper member 10, to be frictionally engaged by the upwardly extending projecting members or arms 13 of the lower member 11. The serrations 16 and resilient projecting arms 13 are so constructed that when constrained by the embracing clamping member 14 they will hold the upper and lower members of the device together and will permit force relative frictional movement between the upper and lower members 10 and 11 when the resilient means 12 are compressed by the severe shock, but will prevent recoil or rebound from the compressed condition of the device and thus will protect the person from such recoil or rebound force.

To this end the circumferential ratchet-like grooves or serrations 16 are each formed by an upwardly and outwardly flaring conical portion and an adjoining upwardly facing shoulder for positive locking engagement with the projecting arms 13. The overturned or hooked end portions 17 of the projecting arm members 13 of the lower member 11 are preferably provided with a sharp beveled edge 18 with a flat bottom to facilitate its positive locking engagement with the shoulder of the ratchet-like grooves or serrations 16, while making it easier for the arm or finger to slide upward across the grooves or serration.

The pojecting arm or finger members 13 of the lower member 11 are sufficiently yieldable and resilient to permit the forced relative frictional movement when the device is compressed under shock, and to permit disengagement thereof from locking engagement with the grooves or serrations upon detachment of the embracing band as when it is desired to reset or re-arm the device.

The upper member 10 is desirably of rounded tubular inverted cup shape to receive and guide the spring means 12 therein. Preferably, in one form of the invention, it comprises a rounded tubular portion providing an intermediate interior downwardly facing shoulder 19 and a plate portion 20 having a press fit into the rounded tubular portion and in seating engagement with the shoulder 19. The partition or plate member 20 may be made integral with the upper member, if desired.

The circumferential ratchet-like serrations or grooves 16 are provided in the exterior upright peripheral surface of the rounded tubular depending skirt portion of the upper member 10.

The bottom edge of the rounded tubular upper member 10 is recessed at intervals therearound to provide circumferentially spaced foot members 21 around the member 10.

The lower member 11 is of generally rounded shape and has a base or bottom from which the projecting arm members 13 extend upwardly at spaced intervals therearound as indicated in the drawings.

Openings or slots 22 may be provided at spaced intervals around the lower member 11 to aline with and to permit passage therethrough of the spaced foot members 21 of the upper member 10, in bottoming on the rubber or elastomer pad under the influence of severe shock.

In the embodiment of FIG. 1 the final fraction of an inch of motion of the device, of the order of about one-eighth of an inch, is thus cushioned in the rubber pad.

The lower member 11 is provided with an upwardly extending round central hub-like member 23 of limited height which receives the lower portion of the resilient means 12 therearound and serves as a guide therefor.

The resilient means 12, according to this invention, preferably comprises a series or stack of round Belleville springs, which have central openings and are guided by the central hub of the lower member 11 and by the inner surface of the depending skirt portion of the inverted cup-shaped upper member 10.

Belleville springs are particularly adapted for absorbing high loads in a very short travel. For example, six Belleville springs as shown in FIG. 1 in a model tested required 500 pounds load to compress 0.36 inch. This enables the shoe bottom or shoe heel shock absorber of the present invention to be constructed so that it will have a high absorption capacity with low overall height.

Figure 2:
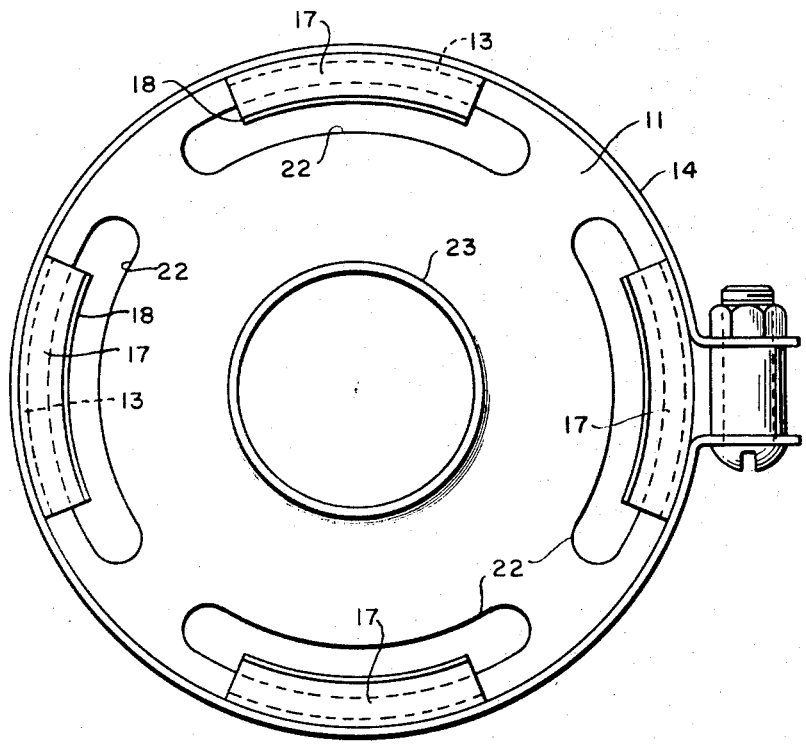
FIG. 2 is a top plan view of the lower member of the device, with an embracing clamping means.

The invention is not limited to the specific structure of the constraining or embracing clamping band member 14 as described in connection with FIGS. 1 and 2. An alternative means for holding the finger-like projections or arms 13 of the lower member 11 against the grooves or serrations 16 of the upper member 10, is the provision of a split band of spring steel, encompassing approximately the circumference of the device, which can be expanded for removal or for resetting or re-arming the shock absorber.

Another alternative construction for the embracing clamping band member 14 is the provision of an embracing or enclosing band of elastic material such as vulcanized rubber.

Figure 3:
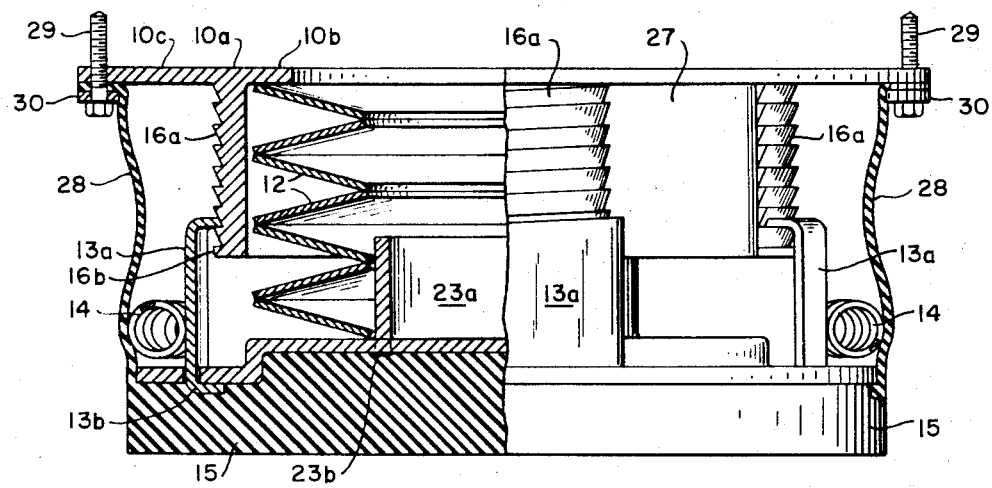
FIG. 3 is an elevation partly in section of another form of the device of the invention.

Another alternative construction for the embracing clamping band member 14 is the provision of an embracing band comprising a garter or coil spring indicated in FIG. 3, which can be applied by pulling it down over the lower member projections or fingers 13 and released by forcing it upwardly off the projections 13.

FIG. 3 illustrates an embodiment of the invention in which the circumferential grooves or serrations are in the form of inclined screw threads 16a and the projecting arms or finger members 13a are correspondingly inclined to engage and follow the inclined screw threads. The screw threads 16a are of upwardly flaring substantially conical shape with an adjoining upwardly facing shoulder, as previously described in connection with the serrations or grooves 16 shown in FIG. 1. The inclined screw threads readily provide for an initial compression of the resilient means or Belleville springs 12 by turning the lower member with its inclined projecting arms or fingers engaging the inclined screw threads. A circumferential terminal flange 16b is provided at the lower end of the upper member 10a.

To facilitate the re-setting or re-arming of the device, the circumferential grooves or serrations or threads may be interrupted to provide smooth areas 27 of the upright peripheral surface portion of the upper member of a width circumferentially to permit the upwardly extending projecting fingers or arms on the lower member to be turned out of engagement with the grooves or serrations or threads onto the smooth areas. The fingers on the lower member then are readily moved downwardly over the smooth areas and the device is reset or rearmed by again turning the projections or fingers on the lower member into engagement with a lower serration or thread. This is illustrated in connection with the embodiment of FIG. 3, but may also be employed, if desired in the embodiment of FIG. 1.

In the embodiment of FIG. 3 the uppermost Belleville spring 12 of which seven are shown in this example, is disposed with its rim in engagement with the under side of a horizontal flange 10b of the upper member 10a.

Figure 4:
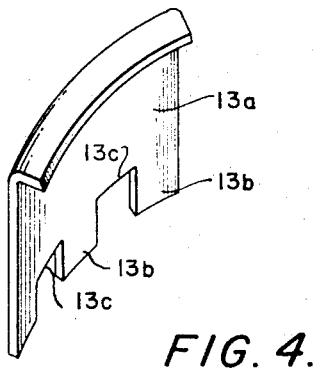
FIG. 4 is a detail view showing one of the projecting arms or fingers prior to its assembly in the embodiment of FIG. 3.

The lower member 11a comprises a plate portion to which the central hub or spring guide member 23a and the inclined projecting arm or finger members 13a are attached. The lower edges 13c (FIG. 4) of the projecting arm members 13a, which engage the plate portion of the lower member 11a, may be inclined so that their upper finger-like ends, which engage the screw threads 16a, are of a proper height and properly inclined to match and follow the inclination or pitch of the screw threads or serrations. However, the inclination of the upper finger-like ends may be provided in any suitable way.

Tabs or projections 13b may be provided extending downwardly from the projecting members 13a and through suitable openings in the plate portion of the lower member 11a and their ends are turned over or peened over against the under side of the plate to fasten them to the plate.

The central hub or spring guide member 23a may be similarly attached to the plate portion of the lower member by means of tabs or projections 23b thereon extending through suitable openings in the plate portion and peened over against the under side of the lower member 11a.

The edge of the plate portion of the lower member 11a extends outwardly beyond the projecting arm or finger members 13a providing a stop which prevents the embracing clamping band member 14a from slipping down off the lower member 11a.

This embodiment of the invention is not designed to provide for the upper member 10a to bottom or the rubber or elastomer member 15 and no openings for such purposes are provided in the lower member 11a.

An outer circumferential flange 10c is desirably provided at the top of the upper member 10a to which is attached the upper end of a tubular cover 28 of rubber or like flexible material by suitable detachment fastening means such as screws 29 and ring 30, which screws also may serve as means to secure the shock absorber device to the shoe bottom, preferably at the heel of the shoe. At the lower end of the tubular rubber cover it is preferably cemented to the side of the rubber heel or bottom member 15 or may be made integral therewith, and will exclude dirt from the device.

The rubber cover may be detached at its upper end and turned down for access to the device.

In the use and operation of the device, having been initially set in the condition illustrated in FIG. 1 or FIG. 3, the projections or arms 13 of the lower member 11 engage the lowermost circumferential groove or serration 16 (or thread 16a, FIG. 3) of the upper member 10 and are held by the removable clamping member 14. The device in this condition is used for walking and the slight shocks incident to walking are absorbed by the rubber or elastomer pad 15.

The device is under sufficient initial compression of the resilient means 12, to hold the projecting arms 13 in firm engagement with the lower serration or groove 16 (or thread 16a).

Upon being subjected to a severe shock transmitted from the supporting surface through the pad 15, which absorbs some of the shock, the lower member 11 (or 11a, FIG. 3) is forced upwardly relative to the upper member 10, compressing the resilient means 12 which absorb the shock, and the arms 13 move upwardly from the lower serration or groove 16 (or thread 16a) to engage in an upper one of the ratchet-like serrations or grooves (or threads 16a) and to positively hold the device in the compressed condition and to prevent recoil or rebound. The person is thus protected by the absorption of the shock by the device and is further protected from any rebound or recoil force of the resilient means 12 which is firmly held in compressed condition.

To re-arm or reset the shock absorber device of the invention, the embracing clamping band member 14 is either released or the member 11 is rotated to permit moving the projecting arms 13 out of recoil preventing engagement with an upper one of the circumferential grooves or serrations or threads. This allows the lower member 11 to be moved down relative to the upper member by the resilient means and then re-engage the projecting arms 13 with the lower serration or groove or thread. The clamping band member 14 is then re-applied so that the shock absorber is thus reset or re-armed for re-use.

A suitable means for securing the shock absorber device of FIG. 1 to the shoe bottom portion, desirably to the heel portion thereof, is indicated schematically in the form of fastening lug or bracket means 31 which may be provided at suitable locations around the upper part of the upper member 10 for attaching engagement with the shoe bottom or heel.

Preferably, the upper member 10 is of rounded tubular shape at its upper part, as well as at its lower part, and the shoe heel or bottom portion may be designed to seat on the upper rim or edge of upper member 10 within or between the fastening means or lugs 31, in the embodiment of FIG. 1.

Obviously many modifications and variations of the present invention are possible in the light of the above teachings. It is therefore to be understood that within the scope of the appended claims the invention may be practiced otherwise than as specifically described.

What is claimed is:

1. A shock absorber for protecting persons from shock transmitted to their pedal extremities and adapted to be mounted on the bottom of a shoe, comprising:
   an upper member to be secured to the bottom of the shoe and having an upright outer peripheral surface with a ratchet-like portion thereon;
   a lower member received on and movable relative to said upper member and having rebound preventing means formed thereon and cooperating with said ratchet-like surface for normally preventing rebound of said lower movable member;
   resilient means disposed between and engaging said upper and lower members; and
   a clamping band means embracing said rebound preventing means and urging it into engagement with said ratchet-like portion to resist recoil or rebound following forced relative movement between said upper and lower members and of said resilient means under shock transmitted to said lower member.

2. A shock absorber to be mounted on the bottom of a shoe as described in claim 1, in which:
   said upper member is of rounded peripheral configuration;
   said upright peripheral surface portion of said upper member being provided with circumferentially extending serrations arranged in a substantially vertical series thereon;
   a plurality of upwardly extending projections on said lower member having overturned ends for engaging the serrations and embraced by said clamping band member;
   said serrations and projections being so constructed that, when held in mutual engagement by said clamping band member embracing said projections on said lower member, forced relative frictional movement will be permitted between said upper and lower members when the resilient means is compressed by shock, but the device will be held in compressed condition and recoil or rebound thereof will be prevented by said serrations and projections and clamping band member, and thus the person will be protected from such recoil or rebound force.

3. A shock absorber according to claim 2, in which: said embracing clamping band member is releasable to facilitate moving said projections out of recoil preventing engagement with an upper and of said circumferential serrations to allow the lower member to be moved down relative to said upper member by said resilient means and to re-apply the projections into engagement with a lower serration and to re-apply the clamping band member to reset the shock absorber for re-use.

4. A shock absorber according to claim 2, in which: said circumferential serrations are each of upwardly and outwardly flaring substantially conical shape providing a shoulder at its upper side for locking engagement with said projections against said rebound or relative separating movement between said upper and lower member.

5. A shock absorber according to claim 2, in which: said resilient means comprises a series or stack of round springs which have central openings; said upper member being of rounded inverted cup shape providing a depending skirt portion receiving and guiding said round springs; and said lower member being of rounded shape and having an upwardly extending central hub-like member to be received in the central openings in said round springs to guide them.

6. A shock absorber according to claim 2, in which: said upper member is of rounded inverted cup shape having a depending skirt portion having recesses in the lower edge thereof providing spaced foot portions; said lower member having a base portion having openings therein to aline with and receive said foot portions; and a pad of elastic material secured to the under side of said base and upon which the foot portions of said member can bottom under severe shock to provide shock absorption by said pad.

7. A shock absorber according to claim 1, in which: said lower member has an annular projecting portion at its lower part to prevent the clamping band member from slipping downwardly thereon; said upper member having at its upper part means for attachment to the bottom portion of a shoe such as the heel portion; and a pad of elastic material secured to the under side of said lower member providing shock absorption in addition to said resilient means.

8. A shock absorber according to claim 1, in which said clamping band member comprises a coil spring.

9. A shock absorber for protecting persons from shock transmitted to their pedal extremities and adapted to be mounted on the bottom of a shoe comprising:
an upper member to be secured to the bottom of the shoe and having an upright peripheral surface portion, said upright peripheral surface portion of said upper member being provided with circumferentially extending serrations arranged in a substantially vertical series thereon;
a lower member movable relative to said upper member and having a plurality of upwardly extending projections for engaging the serrations;
said serrations being interrupted by a plurality of smooth areas of the upright peripheral surface portion of the upper member of a width circumferentially to permit the upwardly extending projections on said lower member to be turned out of engagement with the serrations onto the smooth areas to permit the projections on the lower member to be readily moved downwardly over the smooth areas and to be turned into engagement with a lower serration;
resilient means disposed between and engaging said upper and lower members; and
a clamping band means member embracing said upwardly extending projections on said lower member and urging it into said frictional engagement to resist recoil or rebound following forced relative movement between said upper and lower members and compression of said resilient means under shock transmitted to said lower member.

10. A shock absorber for protecting persons from shock transmitted to their pedal extremities and adapted to be mounted on the bottom of a shoe comprising:
an upper member to be secured to the bottom of the shoe and having an upright peripheral surface portion, said upright peripheral surface portion being provided with circumferentially extending serrations of upwardly and outwardly flaring substantially conical shape, arranged in a substantially vertical series of inclined screw thread configuration;
a lower member movable relative to said upper member and having a plurality of upwardly extending projections, said projections having overturned upper ends, correspondingly inclined to conform to and follow the inclination or pitch of the thread serrations;
said inclined screw thread configuration providing a shoulder at its upper side for locking engagement with said projections against relative separating movement between said upper and lower member;
resilient means disposed between and engaging said upper and lower members; and
a clamping band means member embracing the lower member and urging it into frictional engagement with said upper member to resist recoil or rebound following forced relative movement between said upper and lower members and compresssion of said resilient means under shock transmitted to said lower member.

References Cited

UNITED STATES PATENTS

| | | | |
|---|---|---|---|
| 1,377,908 | 5/1921 | Moore | 36—7.8 XR |
| 1,675,256 | 6/1928 | Crosthwait | 36—38 |
| 1,942,312 | 1/1934 | Tutoky | 36—38 |
| 2,172,004 | 9/1939 | Anderson | 248—24 |
| 2,519,458 | 8/1950 | Hall | 36—7.5 |
| 2,639,913 | 5/1953 | Reynolds | 297—216 XR |
| 3,113,755 | 12/1963 | Stevens et al. | 248—358 |

FOREIGN PATENTS 918,661  2/1963  Great Britain.

CHANCELLOR E. HARRIS, *Primary Examiner.*

R. P. SEITTER, *Assistant Examiner.*

U.S. Cl. X.R.

36—38; 248—26